United States Patent
Kim et al.

(10) Patent No.: US 10,101,843 B2
(45) Date of Patent: Oct. 16, 2018

(54) METHOD FOR RECOGNIZING FINGERPRINT AND MOBILE TERMINAL SUPPORTING THE SAME

(71) Applicant: Samsung Electronics Co., Ltd., Gyeonggi-do (KR)

(72) Inventors: Hyunkyoung Kim, Seoul (KR); Daesung Kim, Gyeonggi-do (KR); Yumi Ahn, Seoul (KR); Jihyun Ahn, Seoul (KR); Hyemi Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 14/596,171

(22) Filed: Jan. 13, 2015

(65) Prior Publication Data
US 2015/0199553 A1    Jul. 16, 2015

(30) Foreign Application Priority Data
Jan. 13, 2014 (KR) .................. 10-2014-0003950

(51) Int. Cl.
G06F 3/041    (2006.01)
G06K 9/00    (2006.01)

(52) U.S. Cl.
CPC .... G06F 3/0416 (2013.01); G06F 2203/0338 (2013.01); G06K 9/0002 (2013.01)

(58) Field of Classification Search
CPC .......... G06F 3/0416; G06F 2203/0338; G06K 9/0002
See application file for complete search history.

(56) References Cited

U.S. PATENT DOCUMENTS

| 6,442,286 B1 * | 8/2002 | Kramer ................ G06K 9/0002 382/124 |
| 6,882,164 B2 * | 4/2005 | Yano .................. G06K 9/00087 324/663 |
| 7,855,843 B2 * | 12/2010 | Smith .................. G02B 17/086 359/726 |
| 8,063,889 B2 * | 11/2011 | Anderson ........... G06F 3/04886 345/172 |

(Continued)

FOREIGN PATENT DOCUMENTS

| KR | 10-2008-0035133 | 4/2008 |
| KR | 10-2012-0015968 | 2/2012 |
| KR | 10-1270348 | 5/2013 |

*Primary Examiner* — Sath V Perungavoor
*Assistant Examiner* — Philip Dang (57) ABSTRACT

A method for recognizing a fingerprint in a portable terminal includes, if a touch input is sensed via a fingerprint scanning sensor, determining whether a touch input event is detected on an object displayed on a screen, deactivating a function corresponding to the detected touch input event on the object if the touch input event is sensed, and performing a function corresponding to the sensed touch input via the fingerprint scanning sensor. A portable terminal includes a display unit configured to display at least one object on a screen, a fingerprint scanning sensor configured to sense a touch input, and a processor configured to deactivate a function corresponding to the detected touch input event on the at least one object if the touch input is sensed, and to perform a function corresponding to the sensed touch event via the finger scanning sensor.

17 Claims, 9 Drawing Sheets

(56) References Cited

U.S. PATENT DOCUMENTS

| | | | | |
|---|---|---|---|---|
| 8,597,111 B2* | 12/2013 | LeMay | ................... | G06Q 30/00 463/25 |
| 2006/0214910 A1* | 9/2006 | Mizuno | ................... | G06F 1/162 345/156 |
| 2007/0188472 A1* | 8/2007 | Ghassabian | .............. | B41J 3/445 345/169 |
| 2008/0278455 A1* | 11/2008 | Atkins | ................ | G06F 3/04883 345/173 |
| 2010/0240415 A1* | 9/2010 | Kim | .................... | G06F 3/03547 455/565 |
| 2011/0109591 A1* | 5/2011 | Kurokawa | .......... | G02F 1/13338 345/175 |
| 2012/0038572 A1* | 2/2012 | Kim | ...................... | G06F 3/0418 345/173 |
| 2012/0075062 A1* | 3/2012 | Osman | ............... | G07C 9/00087 340/5.61 |
| 2012/0268248 A1* | 10/2012 | Hiraide | ................. | H04L 9/3231 340/5.83 |
| 2013/0135247 A1* | 5/2013 | Na | .......................... | G06F 21/32 345/174 |
| 2013/0278552 A1* | 10/2013 | Kamin-Lyndgaard | ....................... | G09G 5/006 345/174 |

\* cited by examiner

METHOD FOR RECOGNIZING FINGERPRINT AND MOBILE TERMINAL SUPPORTING THE SAME

CROSS-REFERENCE TO RELATED APPLICATION AND CLAIM OF PRIORITY

The present application is related to and claims the benefit under 35 U.S.C. § 119(a) of a Korean patent application filed on Jan. 13, 2014 in the Korean Intellectual Property Office and assigned Serial No. 10-2014-0003950, the entire disclosure of which is hereby incorporated by reference.

TECHNICAL FIELD

The present disclosure relates to a method for recognizing a fingerprint and a mobile terminal supporting the same and, more particularly, to a method for recognizing a user fingerprint and a mobile terminal supporting the same in order to perform a desired function.

BACKGROUND

Recently, methods for utilizing a user finger print are being diversified in order to perform user authentication. The fingerprint has advantages of no needs to carry, less danger of copy or piracy, and no changes during life. For obtaining a fingerprint image, fingerprint recognizing sensors are available such as an optical fingerprint recognizing sensor and semiconductor fingerprint recognizing sensor.

By using a fingerprint recognizing sensor, a touch method and a touch swipe method are used for inputting a user fingerprint. In the touch method, a user maintains a finger touch on a fingerprint recognizing sensor for a predetermined time. In the touch swipe method, the user swipes a finger touch on the fingerprint recognizing sensor. Here, the touch swipe means a gesture which a user touches a specific location and drags a finger in a specific direction while keeping the touch.

In the prior art, there is a problem that an undesired function can be performed if a touch event is input in an adjacent area of the fingerprint recognizing sensor while performing a touch or touch swipe operation.

Further, a user may experience an inconvenience of repeating the touch or touch swipe operation because a desired function is not correctly performed.

SUMMARY

To address the above-discussed deficiencies, it is a primary object to provide a method for recognizing a user fingerprint and a portable terminal supporting the same.

In accordance with an aspect of the present disclosure, a method for recognizing a fingerprint in a portable terminal includes if a touch input is sensed via a fingerprint scanning sensor, determining whether a touch input event is detected on an object displayed on a screen, deactivating a function corresponding to the detected touch input event on the object if the touch input event is sensed, and performing a function corresponding to the sensed touch input via the fingerprint scanning sensor.

In accordance with another aspect of the present disclosure, a portable terminal includes a display unit configured to display at least one object on a screen, a fingerprint scanning sensor configured to sense a touch input, and a processor configured to deactivate a function corresponding to the detected touch input event on the at least one object if the touch input is sensed, and to perform a function corresponding to the sensed touch event via the finger scanning sensor.

In accordance with yet another aspect of the present disclosure, a method for recognizing a fingerprint in a portable terminal includes deciding whether a touch input operation is identified through a fingerprint scanning sensor, deciding whether a touch event input is received to request for performing a function of the portable terminal when identifying the touch input operation, deactivating a function corresponding to the touch event input if the touch event input is received, and performing a function corresponding to the touch input operation.

In accordance with yet another aspect of the present disclosure, a method for recognizing a fingerprint in a portable terminal includes receiving a touch event input for a predetermined time through a fingerprint scanning sensor, deciding a predetermined bottom area of the display unit as an inactive area so as not to perform a function corresponding to the touch event input, and displaying the inactive bottom area differently to distinguish from the remaining area, deciding whether a touch input operation is identified through the fingerprint scanning sensor, deciding whether a touch event input is received to request for performing a function of the portable terminal when identifying the touch input operation, deactivating a function corresponding to the touch event input if the touch event input is received, and performing a function corresponding to the touch input operation.

In accordance with another aspect of the present disclosure, a method for recognizing a fingerprint in a portable terminal is disclosed. The method includes: receiving a touch event input for a predetermined time through a fingerprint scanning sensor and a predetermined bottom area of the display unit, deciding the predetermined bottom area of the display unit as an inactive area so as not to perform a function corresponding to the touch event input, displaying the inactive bottom area differently to distinguish from the remaining area, deciding whether a touch input operation is identified through the fingerprint scanning sensor, deciding whether a touch event input is received to request for performing a function of the portable terminal when identifying the touch input operation, deactivating a function corresponding to the touch event input if the touch event input is received, and performing a function corresponding to the touch input operation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

It is to be understood that the singular forms "a", "an", and "the" include plural referents unless the context dictates otherwise. By the term "and", it is meant that at least one of the listed items and their combinations are included.

Further, the terms "unit" and "module" means at least one function or unit for processing an operation, which can be implemented by hardware, software, or their combinations.

Hereinafter, the present disclosure is described referring to the accompanying drawings.

Further, it is to be understood that a touch operation through a fingerprint scanning sensor according to the present disclosure includes at least one method of maintaining a touch for a predetermined time and a touch swipe method.

Figure 1:
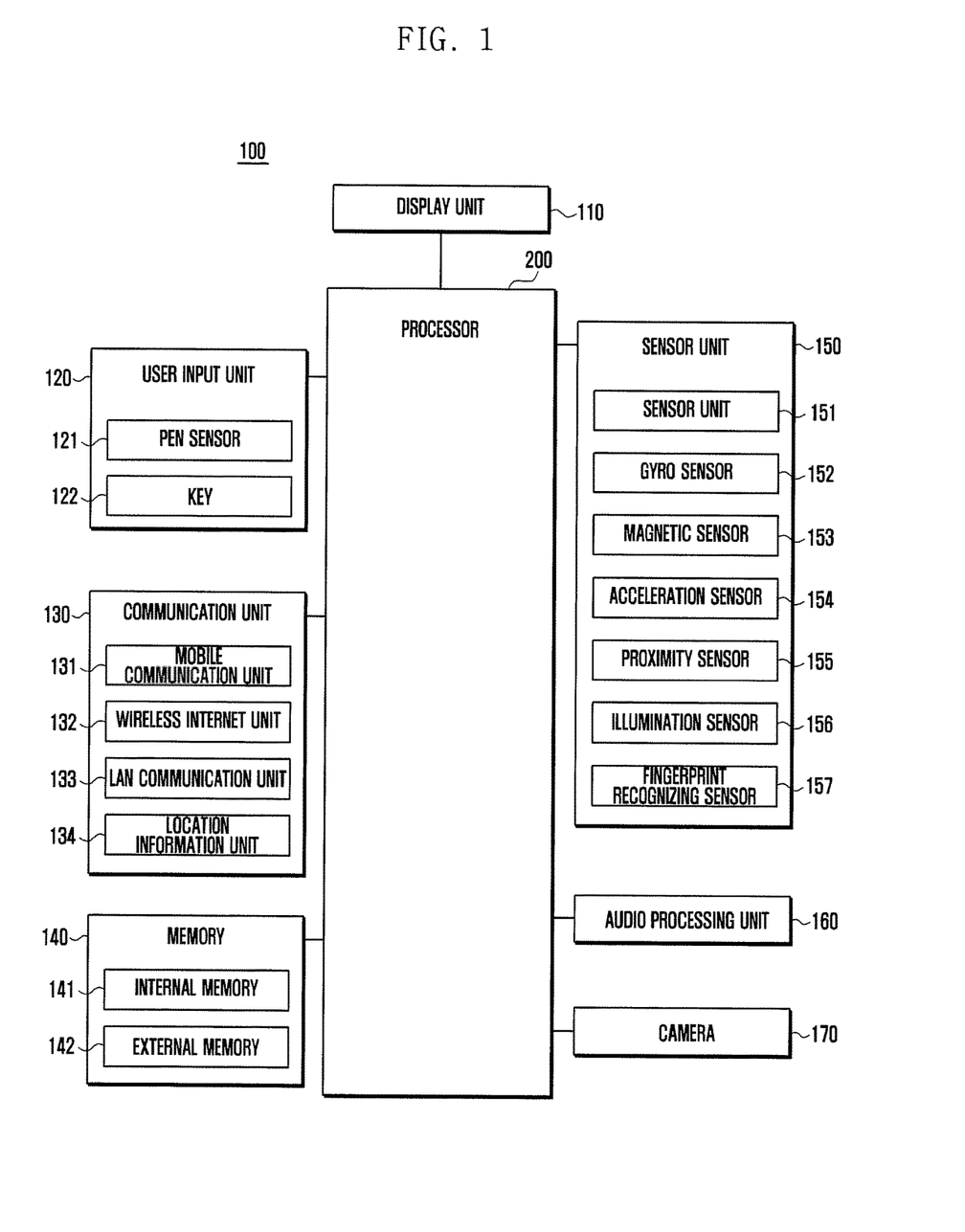
FIG. 1 is a block diagram illustrating a configuration of portable terminal according to an embodiment of the present disclosure.

FIG. 1 is a block diagram illustrating a configuration of portable terminal 100 according to an embodiment of the present disclosure.

The configuration of portable terminal 100 according to the present disclosure can be applied not only to a smart phone but also to various devices. For example, the configuration of portable terminal 100 can be applied to a tablet PC, PMP (Portable Multimedia Player), PDA (Personal Digital Assistant), laptop PC, and wearable devices such as a wrist watch and HMD (Head-Mounted Display).

The portable terminal 100 can include a display unit 110, user input unit 120, communication unit 130, memory 140, sensor unit 150, audio processing unit 160, camera 170, and processor 200.

Referring to FIG. 1, the display unit 110 performs a function of showing an image or data to a user. The display unit 110 can include a display panel such as an LCD (Liquid Crystal Display) and an AM-OLED (Active-Matrix Organic Light-Emitting Diode). Here, the display unit 110 can further include a controller for controlling the display panel. The display panel can be provided in a flexible, transparent, or wearable form.

In the meantime, the display unit 110 can be provided in a touch screen form by combining with a touch panel. For example, the touch screen can be configured with an integrated module by combining the display panel with a touch panel in a layer structure.

The touch panel can be configured with at least one of a capacitive type, pressure sensitive type, infrared type, and ultrasonic type, and can recognize a user's touch input. The touch panel can further include a controller (not shown). In the meantime, the capacitive type can perform proximity recognition as well as a direct touch. The touch panel can further include a tactile layer, and provide a touch reaction for a user.

According to an embodiment of the present disclosure, the display unit 110 can receive a touch event input requesting for performing a function of the portable terminal 100. The display unit 110 can transmit information of the received touch event to the processor 200.

The display unit 110 can display an inactive area if the inactive area is decided by the processor 200. Further, the display unit 110 can display the inactive bottom area differently to distinguish from the remaining area. Here, the differently displaying can include patterns at least one of a shape designated by a user, circle, semicircle, triangle, rectangle, flower, and butterfly.

Further, the display unit 110 can display a fingerprint display area by combining with a fingerprint scanning sensor 157. The fingerprint display area can be an area for displaying an effect of fingerprint recognized by the fingerprint scanning sensor 157. For example, when a user performs a touch operation or a touch swipe operation in the fingerprint display area, a function corresponding to the touch operation can be performed by the processor 200. Further, according to an embodiment of the present disclosure, the fingerprint can be recognized through the display unit 110 combined with the fingerprint scanning sensor 157, and a function corresponding to the recognized fingerprint can be performed preferentially.

The user input unit 120 can receive various commands from a user and can include at least one of a pen sensor 121 and a key 122.

The pen sensor 121 can be provided in the same method as receiving a user's touch input by using a separate pen recognition sheet.

The key 122 can include a mechanical key or a touch key. The mechanical key can include a power button installed at a side of the portable terminal 100 which switches on the display of the portable terminal 100 by pushing, at least one volume button installed at another side of the portable terminal 100 which controls a sound volume, and a home button installed at the bottom of the display unit 110 of the portable terminal 100 which switches to a home screen if pushed.

The touch key can include at least one of a menu key installed at a bottom side of the display unit 110 of the portable terminal 100 which provides a menu related to currently displayed contents if touched, and a return key installed at another bottom side of the display unit 110 of the portable terminal 100 which switches the currently displayed screen to a previous screen.

The communication unit 130 can include at least one of a mobile communication unit 131, wireless internet unit 132, LAN communication unit 133, and location information unit 134.

The mobile communication unit 131 transmits and receives a wireless signal with at least one of a base station for a mobile communication network, external terminal, and server. The wireless signal can include a voice call signal, video call signal, or data of various types related to transmission of a character or multimedia message.

The wireless internet unit 132 performs a function for a wireless internet connection. WLAN (Wireless LAN), Wi-Fi, Wibro (Wireless broadband), Wimax (World Interoperability for Microwave Access), and HSPDA (High Speed Downlink Packet Access) can be used as the technology of wireless internet.

The LAN communication unit 133 performs a function for a LAN communication. Bluetooth, RFID (Radio Frequency Identification), IrDA (Infrared Data Association), UWB (Ultra Wideband), and Zigbee can be used as the technologies of LAN communication.

The location information unit 134 obtains or identifies a location of the portable terminal 100. The location information unit 134 can obtain location information by using a GNSS (Global Navigation Satellite System). Here, the GNSS is a term used for describing wireless navigation satellite systems which decides locations of specific wireless navigation receivers at the surface of the earth or near by the surface of the earth.

As the GNSS, GPS (Global Position System) operating in USA, Galileo operating in Europe, GLONASS (Global Orbiting Navigational Satellite System) operating in Russia, COMPASS operating in China, and QZSS (Quasi-Zenith Satellite System) operating in Japan are available.

Additionally, the communication unit 130 can include a network interface (for example, LAN card) or a modem for connecting the portable terminal 100 to a network such as Internet, LAN (Local Area Network), WAN (Wire Area Network), telecommunication network, cellular network, satellite network, and POTS (Plain Old Telephone Service).

The memory 140 can include at least one of an internal memory 141 and an external memory 142.

The internal memory 142 can include at least one of a volatile memory (such as a DRAM (Dynamic RAM), SRAM (Static RAM), and SDRAM (Synchronous Dynamic RAM)), non-volatile memory (such as an OTPROM (One Time Programmable ROM), PROM (Programmable ROM), EPROM (Erasable and programmable ROM), EEPROM (Electrically Erasable and Programmable ROM), Mask ROM, and Flash ROM), hard disk drive (HDD), or solid state drive (SSD). According to an embodiment of the present disclosure, the processor 200 can process commands or data received from at least one of the non-volatile memory or other components by loading into the volatile memory. Further, the processor 200 can save data generated or received from other components in the volatile memory.

The external memory 142 can include a CF (Compact Flash), SD (Secure Digital), Micro-SD (Micro Secure Digital), Mini-SD (Mini Secure Digital), xD (Extreme Digital), and memory stick.

The memory 140 can store an operating system for controlling the sources of the portable terminal 100 and programs for operating applications. The operating system can include a kernel, middleware, and API, for example, Android, iOS, Windows, Symbian, Tizen, and Bada operating systems.

The kernel can include a system resource manager for managing the system resources and device drivers. The system resource manager can include a process manager, memory manager, or file system manager, and can perform functions such as a control, allocation, or reclaim of system resources. The device driver enables various components of the portable terminal 100 to access software.

For this, the device driver can be divided into an interface and individual driver modules provided by a hardware manufacturer. For example, the device driver can include at least one of a display driver, camera driver, Bluetooth driver, shared memory driver, USB driver, keypad driver, Wi-Fi driver, audio driver, and IPC (Inter-Process Communication) driver.

The middleware can be configured with a plurality of modules which are provided to support commonly necessary functions in various applications. The middleware provides the commonly necessary functions through API so that the application can effectively use limited system resources in an electronic device. For example, the middleware can include at least one of an application manager, window manager, multimedia manager, resource manager, power manager, database manager, and package manager.

Further, the middleware can include at least one of a connectivity manager, notification manager, location manager, graphic manager, and security manager, runtime library, and other library module according to the design of portable terminal. The runtime library is a library module used by a compiler for adding a new function through a programming language while executing an application.

For example, the runtime library can perform an input/output management or mathematical functions. The middleware can be used by generating a new middleware module through combining the aforementioned internal component modules. In the meantime, the middleware can provide specific modules according to the types of operating system in order to provide differentiated functions.

The API is a combination of API programing functions, and can be provided in different forms according to the operating system. For example, in case of Android or iOS, one API set can be provided for each platform, and in case of Tizen, more than one API set can be provided.

The application can perform at least one function by using a program. The application can be divided into a preloaded application and a third party application. For example, the application can include a home application performing a home screen, dialer application, SMS (Short Message Server)/MMS (Multi-Media Message Service) application, IM (Instant Message) application, browser application, camera application, alarm application, contacts (or address book) application, voice dial application, email application, calendar application, media player, album application, and clock application.

According to an embodiment of the present disclosure, the memory 140 can include user's biometric information. The memory 140 can store the information according to fingerprint images of thumbs, index fingers, middle fingers, ring fingers, and little fingers of both hands.

For example, the memory 140 can store a telephone number for a function corresponding to a fingerprint image of the left thumb and a music file play as a function corresponding to a fingerprint image of the right index finger. The processor 200 can stop an internet function and perform a telephone number function with a telephone number stored in the memory 140, if the fingerprint image of the user's left thumb is obtained through the fingerprint scanning sensor 157 while using the internet. When performing the telephone number function, a user interface corresponding to the telephone number function can be displayed in the display unit 110.

Further, storing a user's fingerprint image in the memory 140 can be performed by obtaining fingerprint images of both hands through the fingerprint scanning sensor 157 and storing functions corresponding to each fingerprint image.

The sensor unit 150 can include a gesture sensor 151, gyro sensor 152, magnetic sensor 153, acceleration sensor 154, proximity sensor 155, illumination sensor 156, or fingerprint scanning sensor 157.

The fingerprint scanning sensor 157 can be an image input device which obtains a specific fingerprint image (or image information of fingerprint) having differences between individual persons. The data of fingerprint image can be obtained in an optical method, semiconductor method, ultrasonic method, or non-contact method.

The optical fingerprint scanning sensor 157 can include a prism, light source, lens, and CCD (Charge Coupled Device). In the optical sensor, the light is projected to the prism if a fingerprint is contacted to the prism, the lens collects the light reflected by the prism, and the CCD obtains the collected light as a fingerprint image.

The semiconductor fingerprint scanning sensor can be configured with a thermal sensor, capacitive sensor, or electric-field sensor. The semiconductor fingerprint scanning sensor can be manufactured in a small size and thereby can be used for a personal appliance.

The thermal sensor can be a fingerprint scanning sensor which obtains a fingerprint image by using a temperature distribution according to temperature differences between contacted and non-contacted parts of fingerprint. The capacitive sensor can be a fingerprint scanning sensor which obtains a fingerprint image by using differences of an electric charge amount or capacitance between ridges of contacted fingerprint. The electric sensor can be a fingerprint scanning sensor which obtains a fingerprint image by using an electric filed generated on a fingerprint contacting with a sensor or around the fingerprint.

In the meantime, the fingerprint scanning sensor 157 can be configured as a part of the processor 200. For example, the fingerprint scanning sensor 157 can perform operations of correcting a fingerprint image or calculating the characteristics of the fingerprint image besides obtaining the fingerprint image. In this case, the fingerprint scanning sensor 157 can be configured with a functional module having a hardware module and a software module.

The fingerprint scanning sensor 157 can be installed at a side of the housing of the portable terminal 100. Further, the fingerprint scanning sensor 157 can have a structure combined with a key 122 of the portable terminal 100. For example, the fingerprint scanning sensor 157 can be physically combined with a home button and one side of the fingerprint scanning sensor 157 can be exposed on the home button so as to contact with a fingerprint.

The fingerprint scanning sensor 157 can be installed into the portable terminal 100 in various forms by considering user's habits and conveniences in operation.

Further, the fingerprint scanning sensor 157 can display a fingerprint recognition area by combining with the display unit 110. The processor 200 can perform a corresponding function if a touch swipe or touch event of maintaining a touch for a predetermined time is input in the fingerprint recognition area of the display unit 110.

The above component names of the portable terminal 100 can be described in a different way. Further, the portable terminal 100 according to the present disclosure can be configured by including at least one of the aforementioned components, and some components can be omitted or other components can be additionally included.

The audio processing unit 160 converts a voice to an electric signal or vice versa. The audio processing unit 160 can converts input/output voice information by using at least one of a speaker, receiver, earphone, and microphone.

The camera 170 performs photographing an image or a moving picture. The camera 170 can include at least one image sensor (including a front lens or a rear lens; not shown), ISP (Image Signal Processor; not shown), or a flash LED (not shown) according to the design of camera.

The processor 200 controls a plurality of hardware and software components connected to the processor, and processes or calculates various data including multimedia data by driving an operating system and application programs. For example, the processor 200 can provide fingerprint input guide information through the display unit 110 or perform user authentication or registration by using an obtained user fingerprint image. The processor 200 can be configured with a SoC (System on Chip) and can further include a GPU (Graphic Processing Unit).

Figure 2:
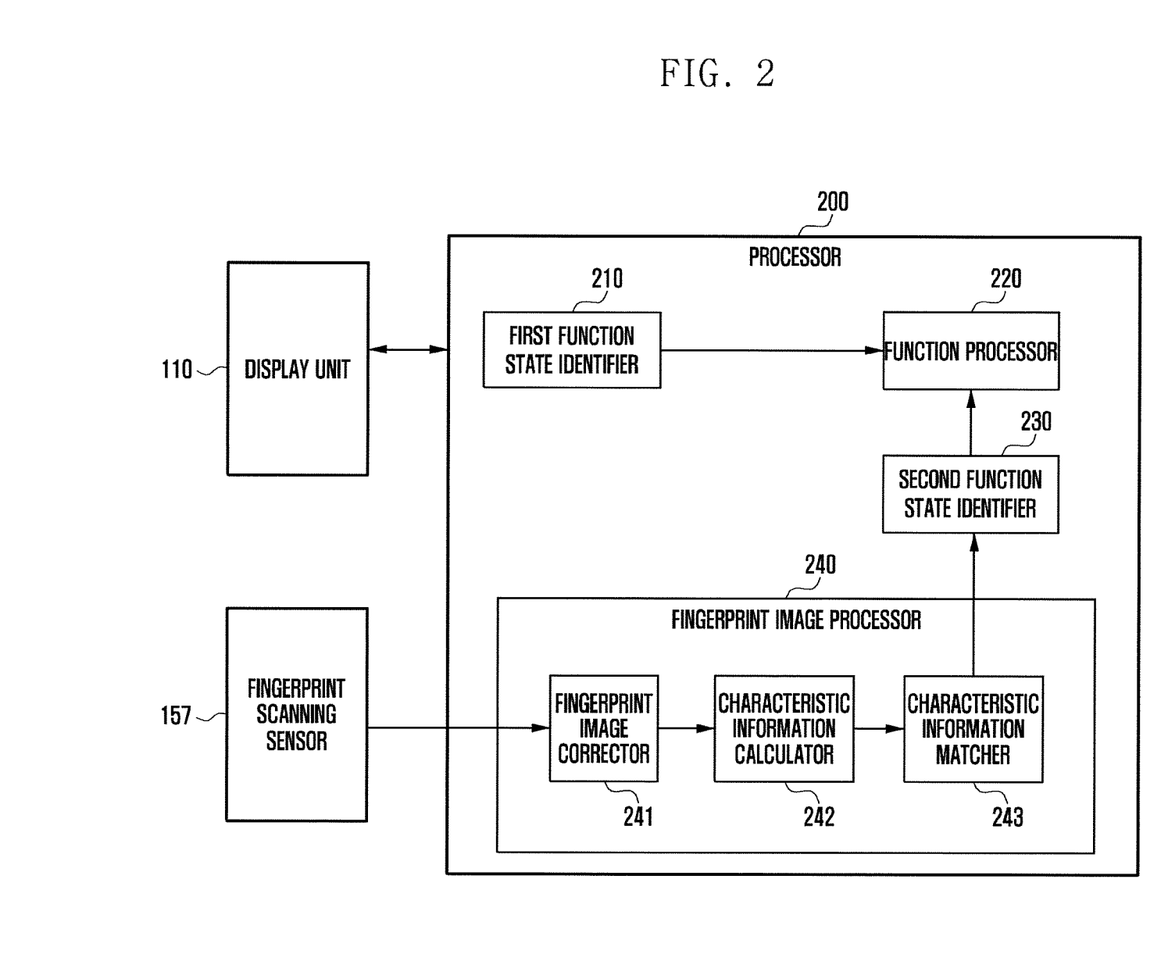
FIG. 2 is a block diagram illustrating a configuration of processor in the portable terminal according to an embodiment of the present disclosure.

FIG. 2 is a block diagram illustrating a configuration of processor 200 in the portable terminal 100 according to an embodiment of the present disclosure.

Referring to FIG. 2, the processor 200 can include a first function state identifier 210, function processor 220, second function state identifier 230, and fingerprint image processor 240. Here, modules 210, 220, 230, and 240 of the processor 200 are configured according to the convenience in description, and can have various forms by omitting, modifying, or combining some of them. Further, the modules 210, 220, 230, and 240 can be configured with hardware, software, or their combinations.

The processor 200 can perform at least one function provided by the portable terminal 100 or receive a signal requesting for registering a user of the portable terminal 100. For example, the processor 200 can request for releasing a lock state screen, switching from a switched-off screen to a switched-on screen, displaying a home screen provided by the portable terminal 100, executing at least one application provided by the portable terminal 100, or receiving a signal for execution of at least one function of application running in the portable terminal 100.

A signal requesting for execution of at least one function can be generated if a user input is received through the user input unit 120, or can be automatically generated by the portable terminal 100 without user intervention.

If a signal requesting for execution of function is received from the display unit 110, the first function state identifier 210 can identify a state of function. For example, if a touch event input for a telephone number application is received from the display unit 110, the first function state identifier 210 can identify that the function of telephone number application is selected.

The function processor 220 can execute at least one function provided by the portable terminal 100. The function processor 220 executes a function if the function is received from the first function state identifier 210 or the second function state identifier 230.

When a touch input operation is identified through the fingerprint scanning sensor 157 according to an embodiment of the present disclosure, the function processor 220 can preferentially execute a function decided by the second function state identifier 230 which identifies a function corresponding to the touch input operation. For example, if a function of telephone number application is decided by the first function state identifier 210 and a function of internet connection is decided by the second function state identifier 230, the function processor 220 can preferentially execute the function of internet connection decided by the second function state identifier 230.

The fingerprint image processor 240 can perform user authentication or registration by processing a fingerprint image obtained by the fingerprint scanning sensor 157. The fingerprint image processor 240 can obtain a fingerprint image from the fingerprint scanning sensor 157 which generates a user's fingerprint image. The fingerprint image corrector 241 of the fingerprint image processor 240 can correct the obtained fingerprint image.

For example, if the fingerprint image has a distorted form or a low resolution area, the fingerprint image corrector 241 can correct or restore the distorted form and low resolution area by using statistical data or an image processing function. The corrected fingerprint image can be provided for a characteristic information calculator 242. In another embodiment, the fingerprint image corrector 241 can be omitted. In this case, the fingerprint image obtained by the fingerprint scanning sensor 157 can be directly transmitted to the characteristic information calculator 242.

The characteristic information calculator 242 can calculate characteristic information of fingerprint image based on the corrected fingerprint image. For example, the characteristic information of fingerprint image can be a minutiae indicating at least one characteristic point. The minutiae can include characteristic points such as a bifurcation point, end point, core, and delta. Further, the minutiae can include characteristic points indicating directions or forms of valleys between ridges. In particular, the characteristic information can be calculated in a characteristic information template which is an information type of format (or frame) predetermined for identification of a matching degree with the characteristic information.

If the fingerprint image is obtained for execution of user authentication, characteristic information calculator 242 can transmit a characteristic information template including characteristic information of the fingerprint image to the characteristic information calculator 243. Alternatively, the characteristic information calculator 242 can store the characteristic information template including characteristic information of the fingerprint image in the memory 140 if the fingerprint image is obtained for user registration.

The characteristic information calculator 243 receives the characteristic information template from the characteristic information calculator 242 and matches a characteristic information template stored in the memory 140. From the result of matching, a matching score indicating matching information between the characteristic information templates can be induced. For example, the matching score can be calculated based on a value indicating the number of identical characteristic points or an extent of correspondence from characteristic points included in the characteristic information template and the registered characteristic information template.

In more detail, the matching score can be calculated according to statistical data or a probability function by considering similarities of a distance, direction, and disposition from a base point to characteristic points included in each characteristic information template. The characteristic information calculator 243 compares the calculated matching score with a specific critical value, and performs a function pre-stored by a user if the matching score is greater than the critical value. Here, the critical value can be determined by a manufacturer of the portable terminal 100, application installed in the portable terminal 100, or supplier of operating system.

Further, the critical value can be determined according to a security level set through a user interface. If user authentication is successfully done, the characteristic information calculator 243 can transmit the corresponding result to the second function state identifier 230. The second function state identifier 230 receives the result of user authentication from the characteristic information calculator 243 and identifies functions corresponding to each fingerprint. The second function state identifier 230 then transmits information of the identified function to the function processor 220.

Further, the second function state identifier 230 can identify a function corresponding to a user's fingerprint image by using the characteristic information calculator 243. The second function state identifier 230 transmits information of an area for deactivating a touch event to the display unit 110 if a touch event input is received for a predetermined time from the fingerprint scanning sensor 157.

Further, if a touch event input is received for a predetermined time from the fingerprint scanning sensor 157 and a predetermined bottom area of the display unit 110, the processor 200 can decide the predetermined bottom area of the display unit 110 as an inactive area in which a function corresponding to the touch event input is not executed. Here, the predetermined bottom area can be an area within a specific critical value of pixels from the bottom edge of the display unit 110. Here, the critical value of pixels can include a vertical size of an application.

The processor 200 can deactivate a function corresponding to the detected touch input event on the at least one object displayed on screen if the touch input is sensed. The processor 200 can perform a function corresponding to the sensed touch event via the finger scanning sensor 157. For example, the touch event to be sensed can be gesture event, such as touch swipe input event, flip input event, flick input event. While a gesture event for sensing a fingerprint is performed by user, the user can touch on an object displayed on a screen accidentally. According to detecting an unintended touch event on the displayed object, the processor 200 can deactivate a function corresponding to the detected object.

The processor 200 can detect an input for a predetermined time on the fingerprint scanning sensor. The processor 200 can determine a predetermined bottom area of the screen as an inactive area, the inactive area not being performed a function corresponding to detected touch input event.

The processor 200 can detect an input for a predetermined time on the fingerprint scanning sensor and a predetermined bottom area of the screen. The processor 200 can determine the predetermined bottom area of the screen as an inactive area, the inactive area not being performed a function corresponding to detected a touch input event.

Figure 3:
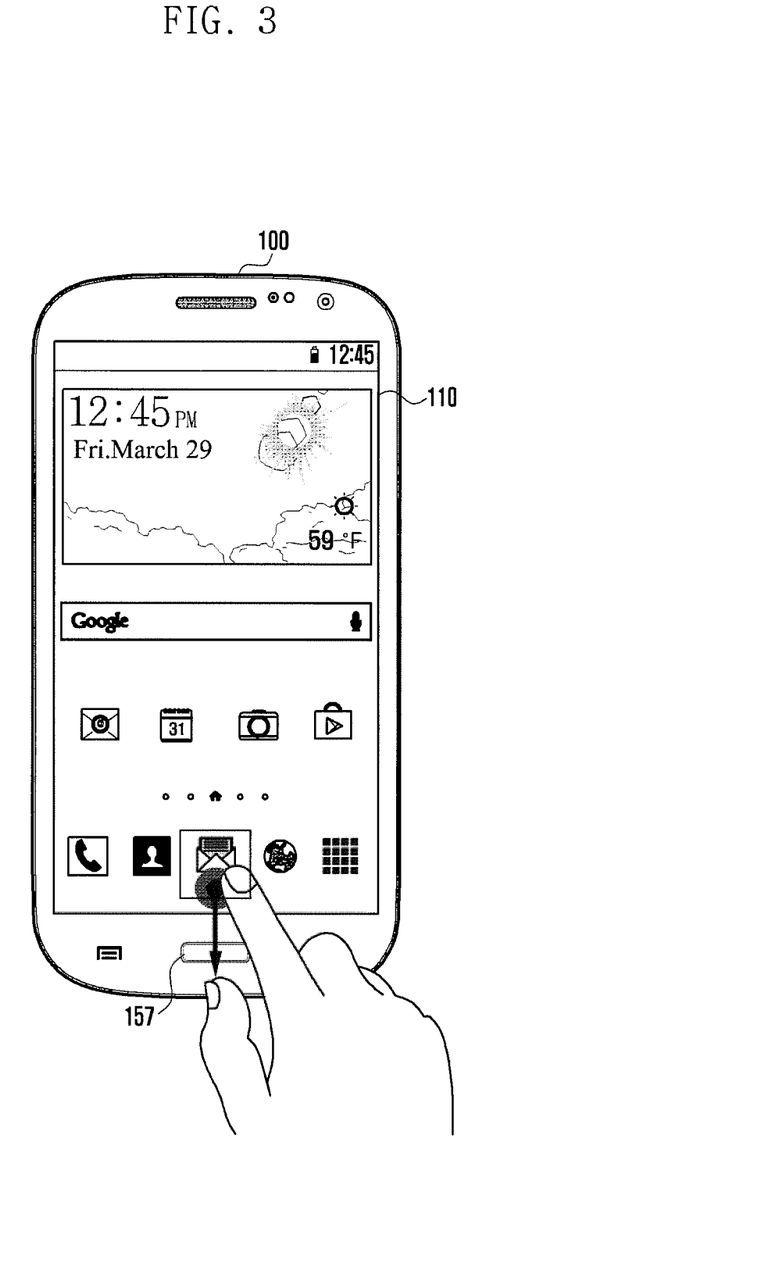
FIGS. 3 to 5 are screen examples illustrating a method for recognizing a fingerprint according to an embodiment of the present disclosure.
Figure 4:
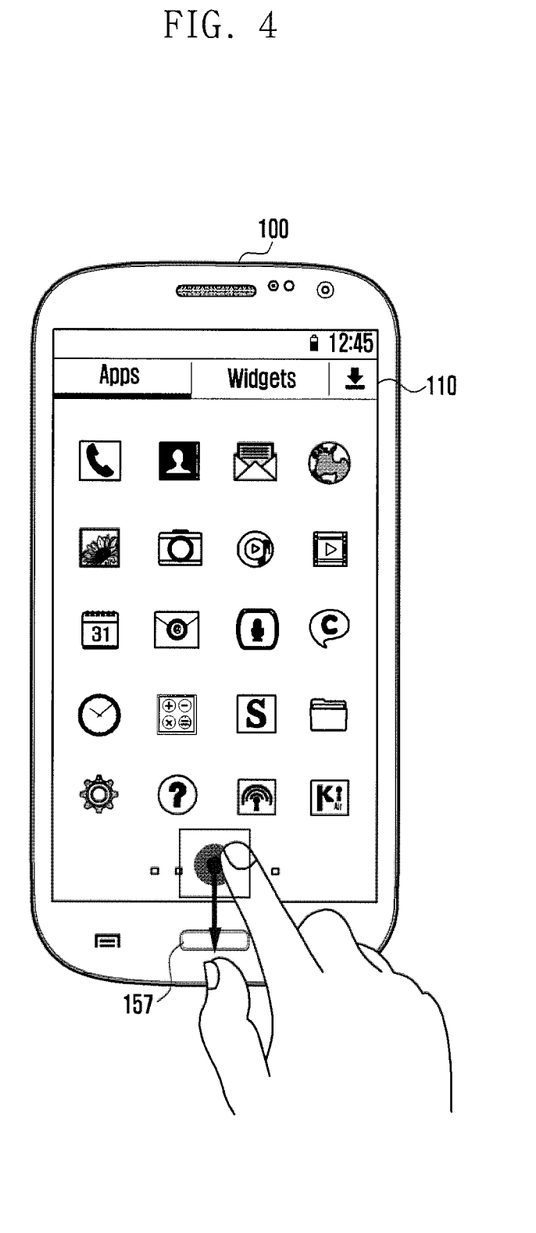
Figure 5:
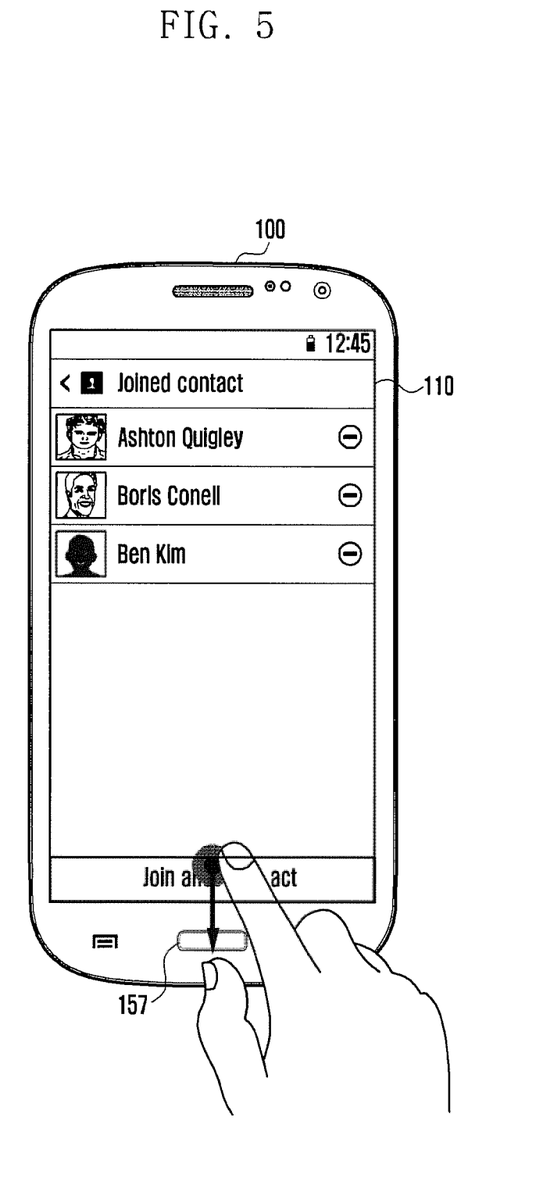

The processor 200 can determine whether the touch input event is detected on a predetermined bottom area of the screen. The processor 200 can determine whether the touch input event is detected on the predetermined bottom area of the screen. The processor 200 can determine whether the touch input event moves as a touch swipe gesture in a direction to the fingerprint scanning sensor if the touch input event is detected on the bottom area of the screen. The processor 200 can deactivate a function corresponding to the detected touch input event on the at least one object if an input is detected via the fingerprint scanning sensor within a predetermined time after the touch input moves the direction. The predetermined bottom area of the screen comprises an area within a critical value of predetermined pixels from the bottom of the screen. FIGS. 3 to 5 are screen examples illustrating a method for recognizing a fingerprint according to embodiments of the present disclosure.

When identifying a touch input operation through the fingerprint scanning sensor 157 according to an embodiment of the present disclosure, a touch event for a specific application or function can be received at the same time. As shown in FIGS. 3, 4, and 5, the touch input operation through the fingerprint scanning sensor 157 can receive a touch event input for an application function, touch event input for switching to another application, touch event input for a communication function. Here, the first function state identifier 210 can decide a function of e-mail application, function of switching to another application, and a communication function.

The second function state identifier 230 can decide a function corresponding to the right index finger. The second function state identifier 230 can preferentially perform the function corresponding to the right index finger prior to a function decided by the first function state identifier 210. Further, the function processor 220 can transmit function information corresponding to the right index finger to the display unit 110.

As illustrated in FIG. 3, a user can perform touch input that moves toward to a direction for sensing fingerprint of the user via the fingerprint scanning sensor 157. While the touch input for sensing is performed, the user can touch an icon of an email application displayed on screen accidentally. If the touch input is sensed via fingerprint scanning sensor 157 within a predetermined time from the time detected on the icon of email application, processor 200 can deactivate a function corresponding to the icon of email application. This embodiment can replace entering passwords to authenticate a user, and be applied to execute any application.

As illustrated in FIG. 4, a user can perform touch input that moves toward to a direction for sensing fingerprint of the user via the fingerprint scanning sensor 157. While the touch input for sensing is performed, the user can touch a page maker displayed on screen accidentally. If the touch input is sensed via fingerprint scanning sensor 157 within a predetermined time from the time detected on the page maker, processor 200 can deactivate a function corresponding to the page maker.

As illustrated in FIG. 5, a user can perform touch input that moves toward to a direction for sensing fingerprint of the user via the fingerprint scanning sensor 157. While the touch input for sensing is performed, the user can touch an inquiry message displayed on screen accidentally. The portable terminal 100 locates an inquiry message on the bottom of the screen. The inquiry message can inquire whether to select a menu in the application whether to make a call, or whether to open contact information or communication history. If the touch input is sensed via fingerprint scanning sensor 157 within a predetermined time from the time detected on the inquiry message, processor 200 can deactivate a function corresponding to the inquiry message.

Figure 6:
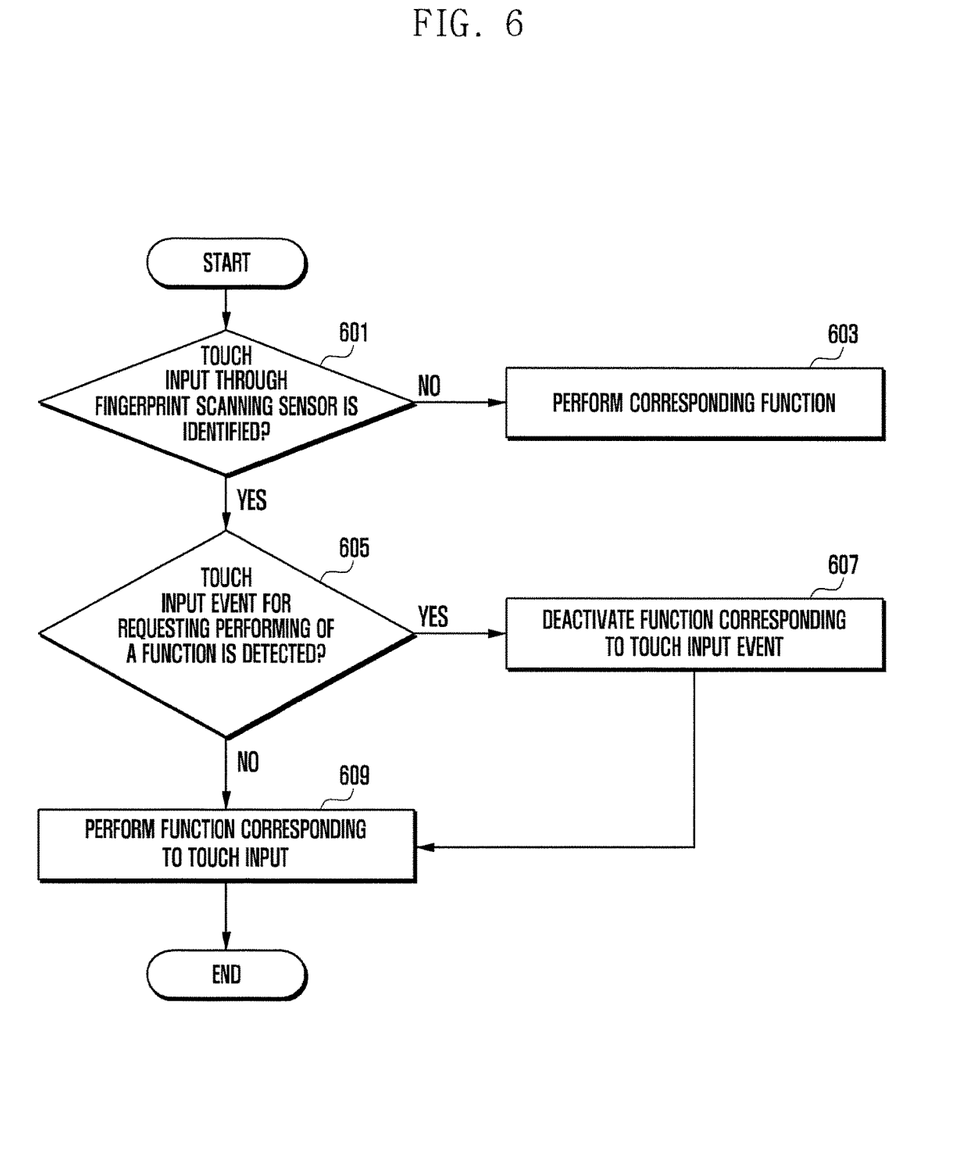
FIG. 6 is a flowchart illustrating a method for recognizing a fingerprint according to an embodiment of the present disclosure.

FIG. 6 is a flowchart illustrating a method for recognizing a fingerprint according to an embodiment of the present disclosure. The processor 200 identifies a touch input through fingerprint scanning sensor 157 at step 601. If the touch input is not identified, the processor 200 executes a corresponding function at step 603.

If touch input is identified, the processor 200 identifies whether a touch event input requesting for executing a function of the portable terminal 100 is detected through the display unit 110 at step 605. Even though a touch event input is received, the processor 200 preferentially executes a function corresponding to the touch input operation. The processor 200 deactivates a function corresponding to the touch input event through the display unit 110 at step 607.

The processor 200 executes a function corresponding to the touch input if a touch input event is not detected through the display unit 110 at step 609. Here, the function corresponding to the touch input operation can include obtaining a fingerprint image according to the identification of touch input operation and deciding a function corresponding to the obtained fingerprint image. For example, functions corresponding to fingerprint images of each finger can be pre-stored in the memory 140, and a function corresponding to the identified touch input operation can be executed by deciding the corresponding function from the memory 140 if a touch input operation is identified.

Figure 7:
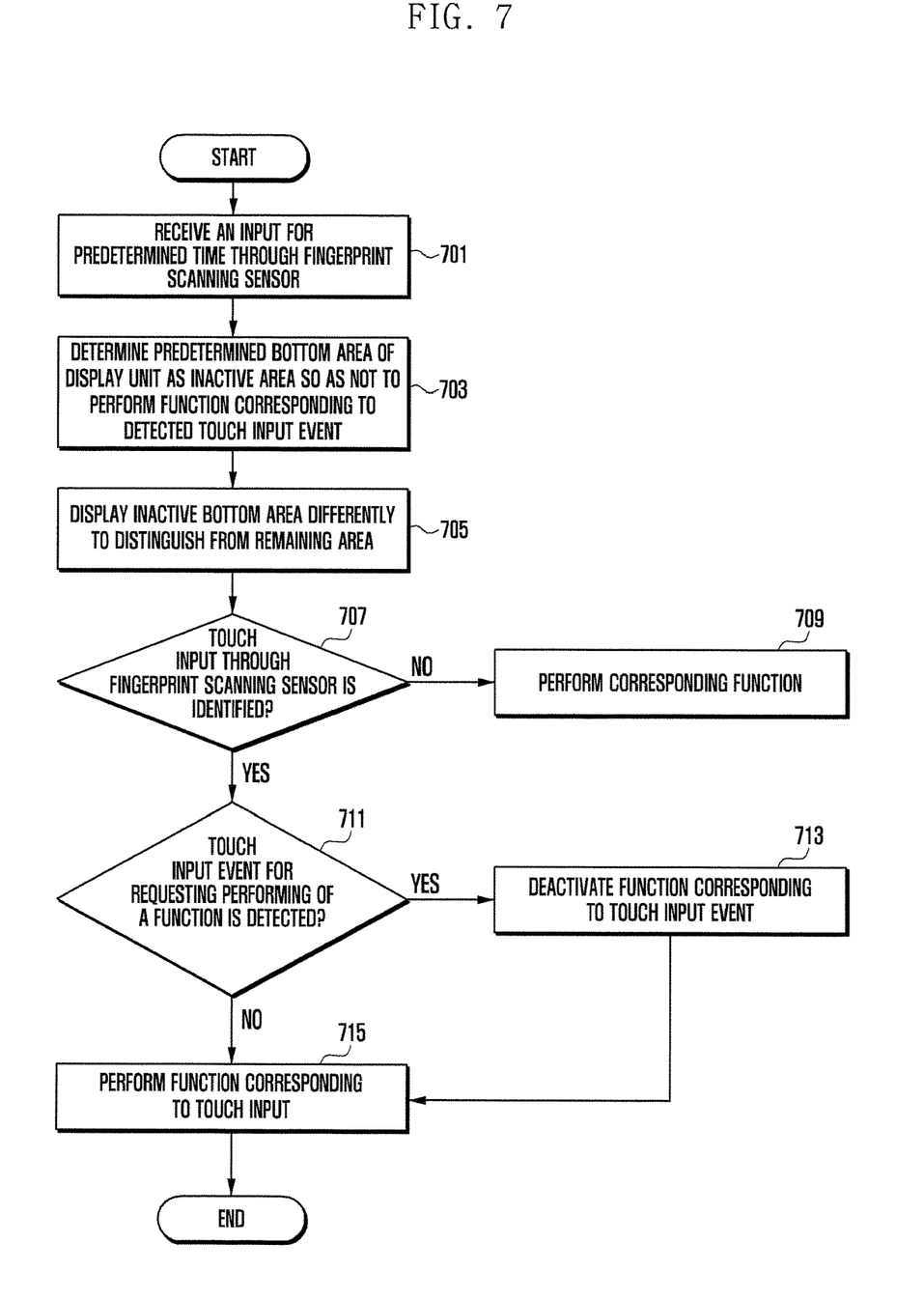
FIG. 7 is a flowchart illustrating a method for recognizing a fingerprint according to another embodiment of the present disclosure.

FIG. 7 is a flowchart illustrating a method for recognizing a fingerprint according to another embodiment of the present disclosure. The portable terminal 100 receives an input for a predetermined time through the fingerprint scanning sensor 157 at step 701. Here, the predetermined time means several seconds predetermined by a user. Further, the fingerprint scanning sensor 157 can be physically combined with a home button of the portable terminal 100, and thereby can receive a touch event input for a predetermined time through the home button.

The processor 200 determine a predetermined bottom area of the display unit 110 as an inactive area in which a function corresponding to the touch input event is not performed at step 703. Here, the inactive area can include an area in which a function corresponding to the touch event input is not performed. The display unit 110 displays the inactive bottom area to distinguish from the remaining area at step 705. In order to display the inactive bottom area differently, the inactive bottom area can be displayed in a form designated by a user, or displayed with at least one of circle, semicircle, triangle, rectangle, flower, and butterfly.

The processor 200 identifies a touch input through the fingerprint scanning sensor 157 at step 707. If the touch input is not identified, the processor 200 performs a corresponding function at step 709. If the touch input is identified, the processor 200 checks whether a touch event input requesting for performing a function of the portable terminal 100 is received through the display unit 110 at step 711. Even though the touch event input is identified, the processor 200 preferentially performs a function corresponding to the identified touch input operation. For this, the processor 200 deactivates the function corresponding to the touch event input received through the display unit 110 at step 713.

If the touch input event is not detected through the display unit 110, the processor 200 performs a function corresponding to the touch input at step 715. Here, the function corresponding to the touch input operation obtains a fingerprint image according to the identification of touch input operation and decides a function corresponding to the obtained fingerprint image. For example, functions corresponding to each finger can be pre-stored in the memory 140 and a function corresponding to the identified touch input operation can be performed by selecting from the memory 140.

Figure 8:
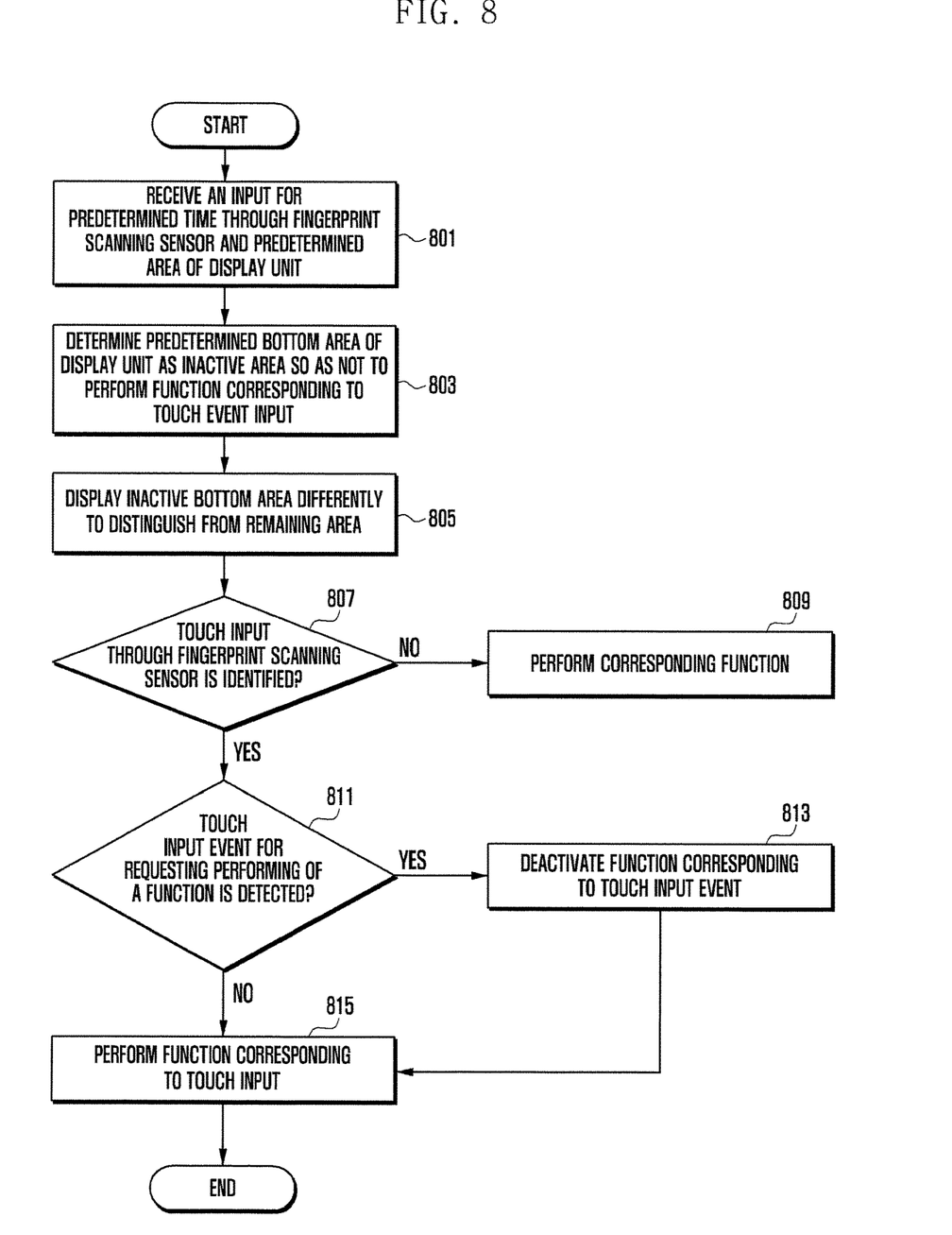
FIG. 8 is a flowchart illustrating a method for recognizing a fingerprint according to further another embodiment of the present disclosure.

FIG. 8 is a flowchart illustrating a method for recognizing a fingerprint according to further another embodiment of the present disclosure. The processor 200 identifies an input for predetermined time through the fingerprint scanning sensor 157 and a predetermined bottom area of the display unit 110 at step 801.

The processor 200 determines the predetermined bottom area of the display unit 110 as an inactive area in which a function corresponding to the touch event input is not performed at step 803. Here, the inactive area can include an area in which a function corresponding to the touch event input is not performed display unit 110. The display unit 110 displays the inactive bottom area differently to distinguish from the remaining area at step 805. In order to display the inactive bottom area differently, the inactive bottom area can be displayed in a form designated by a user, or displayed with at least one of circle, semicircle, triangle, rectangle, flower, and butterfly.

The processor 200 identifies a touch input through the fingerprint scanning sensor 157 at step 807. If the touch input is not identified, the processor 200 performs a corresponding function at step 809.

If the touch input is identified, the processor 200 checks whether a touch event input requesting for performing a function of the portable terminal 100 is received through the display unit 110 at step 811. Even though the touch event input is identified, the processor 200 preferentially performs a function corresponding to the identified touch input operation. For this, the processor 200 deactivates the function corresponding to the touch input event received through the display unit 110 at step 813.

If the touch event input is not received through the display unit 110, the processor 200 performs a function corresponding to the touch input at step 815. Here, the function corresponding to the touch input operation obtains a fingerprint image according to the identification of touch input operation and decides a function corresponding to the obtained fingerprint image. For example, functions corresponding to each finger can be pre-stored in the memory 140 and a function corresponding to the identified touch input operation can be performed by selecting from the memory 140.

Figure 9:
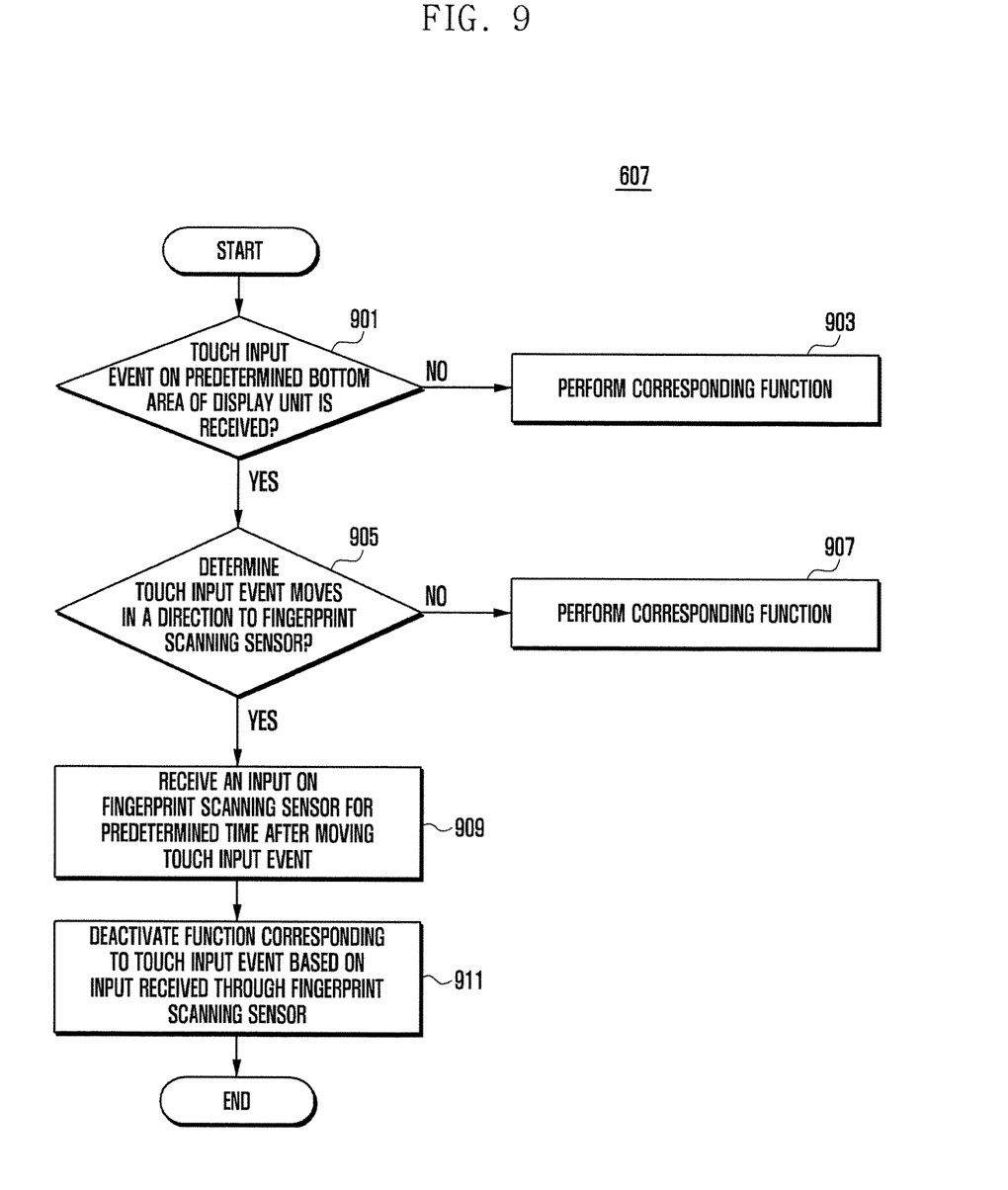
FIG. 9 is a flowchart illustrating a method for recognizing a fingerprint according to further another embodiment of the present disclosure.

FIG. 9 is a flowchart illustrating a method for recognizing a fingerprint according to further another embodiment of the present disclosure. FIG. 9 is a flow chart illustrating a more detailed procedure of deactivating a function corresponding to a touch event input. The processor 200 identifies whether a touch input event is received on a predetermined bottom area of the display unit 110 at step 901. If the touch input event is not received from the predetermined bottom area, the processor 200 performs a function corresponding to each touch event at step 903.

If the touch input event is received from the predetermined bottom area, the processor 200 determines touch input event moving in a direction to fingerprint scanning sensor 157 at step 905. Here, the direction to the fingerprint scanning sensor 157 can be the downward direction in the display unit 110.

If the touch input event is not identified, the processor 200 performs a function corresponding to the touch input event at step 907. The fingerprint scanning sensor 157 receives an input on the fingerprint scanning sensor 157 for a predetermined time after moving touch input event at step 909. The function corresponding to the touch input event is then deactivated based on input received through the fingerprint scanning sensor 157 at step 911.

It is to be understood that the aforementioned embodiments of the present disclosure can be implemented by software, hardware, or their combinations. The software can be stored in a recording media readable by a computer such as volatile or non-volatile memory (for example, a ROM, RAM, memory chip, and integrated circuit), and optical or magnetic media (for example, a CD, DVD, magnetic disk, and magnetic tape).

According to the present disclosure, a method for using a user log in a portable terminal and an apparatus using the same can be implemented by using a computer or a portable terminal including a processor and a memory, and the memory corresponds to a recording medium suitable for storing programs including instructions according to embodiments of the present disclosure. Therefore, the present disclosure includes recording media readable by a computer in order to store program codes for implementing the apparatus and methods in the appended claims.

Further, such a program can be electronically transmitted by media such as a communication signal through wired or wireless connection, and the present disclosure properly includes equivalents. The method for using a user log in a portable terminal and an apparatus using the same can store programs by receiving from a program provider connected through a wired or wireless connection. By adjusting settings of the portable terminal, a user can limit the operations within a user terminal or selectively extend to synchronize with a server through a network according to embodiments of the present disclosure.

According to embodiments of the present disclosure, performance of functions undesired by a user can be avoided while performing fingerprint recognition through a touch input operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for recognizing a fingerprint in a portable terminal, the method comprising:
   detecting an input for a predetermined time on a fingerprint scanning sensor;
   determining, in response to the input for the predetermined time, a bottom area within a critical value of predetermined pixels of a screen as an inactive area and displaying the inactive bottom area differently to distinguish from a remaining of the screen;
   Sensing a touch input via the fingerprint scanning sensor;
   determining, in response to sensing the touch input via the fingerprint scanning sensor, whether a touch input event is received on an object displayed on the screen, the touch input event being received by the sensed touch input via the fingerprint scanning sensor;

deactivating, in response to the receiving of the touch input event, a first function corresponding to the touch input event on the object; and performing a second function corresponding to the touch input sensed via the fingerprint scanning sensor.

2. The method of claim 1, wherein the performing a second function corresponding to the touch input comprises:
obtaining a fingerprint image by identifying the touch input;
determining a function corresponding to the obtained fingerprint image as the second function; and
performing the determined second function.

3. The method of claim 1, wherein the deactivating of the first function comprises deactivating the first function corresponding to the received touch input event on the object in response to determining whether the touch input event is detected on a predetermined bottom area of the screen.

4. The method of claim 1, further comprising:
detecting an input for a predetermined time on the fingerprint scanning sensor and a predetermined bottom area of the screen before sensing the touch input via the fingerprint scanning sensor;
determining the predetermined bottom area of the screen as an inactive area, the inactive area not being performed a first function corresponding to a touch input event; and
displaying the inactive bottom area differently to distinguish from the remaining area of the screen.

5. The method of claim 1, wherein the deactivating a first function corresponding to the touch input event comprises:
determining whether the touch input event is detected on a predetermined bottom area of the screen;
determining whether the touch input event moves as a touch swipe gesture in a direction toward the fingerprint scanning sensor if the touch input event is detected on the predetermined bottom area; and
deactivating a first function corresponding to the detected touch input event on the object if an input is detected via the fingerprint scanning sensor within a predetermined time after the touch input moves the direction.

6. The method of claim 2, wherein the determining a second function corresponding to the obtained fingerprint image comprises:
extracting a fingerprint image from one of a thumb, index finger, middle finger, ring finger, and little finger.

7. The method of claim 3, wherein one side of the fingerprint scanning sensor is exposed by combining with a home button of the portable terminal so that a fingerprint image can be contacted.

8. The method of claim 4, wherein the displaying the inactive bottom area differently from the remaining area comprises:
displaying the inactive bottom area in a form predetermined by a user, or in a form at least one of a circle, semicircle, triangle, rectangle, flower, and butterfly.

9. A portable terminal comprising:
a display unit configured to display at least one object on a screen;
a fingerprint scanning sensor configured to sense a touch input; and
a processor configured to:
detect an input for a predetermined time on the fingerprint scanning sensor,
determine, in response to the input for the predetermined time, a bottom area within a critical value of predetermined pixels of a screen as an inactive area,
control the display unit to display the inactive bottom area differently to distinguish from a remaining of the screen,
determine, in response to sensing the touch input via the fingerprint scanning sensor, whether a touch input event is received on the at least one object displayed on the screen, the touch input event being received by the sensed touch input via the fingerprint scanning sensor;
deactivate, in response to the receiving of the touch input event, a first function corresponding to the touch input event; and
perform a second function corresponding to the sensed touch input via the fingerprint scanning sensor.

10. The portable terminal of claim 9, wherein the processor comprises:
a fingerprint image processor configured to obtain a fingerprint image by identifying the touch input.

11. The portable terminal of claim 9, wherein the processor is configured to deactivate the first function corresponding to the received touch input event on the object in response to determining whether the touch input event is detected on the bottom area of the screen.

12. The portable terminal of claim 9, wherein the processor is configured to detect an input for a predetermined time on the fingerprint scanning sensor and a predetermined bottom area of the screen and determine the predetermined bottom area of the screen as an inactive area, the inactive area not being performed a first function corresponding to a touch input event, and
the display unit is configured to display the inactive bottom area differently to distinguish from the remaining area of the screen.

13. The portable terminal of claim 9, wherein the processor is configured to determine whether the touch input event is detected on a predetermined bottom area of the screen, determine whether the touch input event moves as a touch swipe gesture in a direction to the fingerprint scanning sensor if the touch input event is detected on the bottom area of the screen, and deactivate a first function corresponding to the detected touch input event on the at least one object if an input is detected via the fingerprint scanning sensor within a predetermined time after the touch input moves the direction.

14. The portable terminal of claim 10, wherein the fingerprint image processor is configured to extract a fingerprint image from one of a thumb, index finger, middle finger, ring finger, and little finger.

15. The portable terminal of claim 11, wherein one side of the fingerprint scanning sensor is exposed by combining with a home button of the portable terminal so that a fingerprint image can be contacted.

16. The portable terminal of claim 11, wherein the display unit is configured to display the inactive bottom area in a form at least one of a circle, semicircle, triangle, rectangle, flower, and butterfly.

17. The portable terminal of claim 9, wherein the fingerprint scanning sensor is configured to obtain a fingerprint image according to a touch swipe operation.

* * * * *